United States Patent
Wong et al.

(10) Patent No.: US 12,005,933 B2
(45) Date of Patent: Jun. 11, 2024

(54) METHODS AND SYSTEMS FOR A UNIFIED DRIVER OVERRIDE FOR PATH BASED AUTOMATED DRIVING ASSIST UNDER EXTERNAL THREAT

(71) Applicant: GM GLOBAL TECHNOLOGY OPERATIONS LLC, Detroit, MI (US)

(72) Inventors: Kin Man Michael Wong, Thornhill (CA); Matthew P Kempeinen, Howell, MI (US); Jimmy Lu, Markham (CA); Brian Porto, Wixom, MI (US); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 17/456,988

(22) Filed: Nov. 30, 2021

(65) Prior Publication Data
US 2023/0166773 A1    Jun. 1, 2023

(51) Int. Cl.
| | |
|---|---|
| *B60W 60/00* | (2020.01) |
| *B60W 30/09* | (2012.01) |
| *B60W 30/12* | (2020.01) |
| *B60W 50/10* | (2012.01) |

(52) U.S. Cl.
CPC ........ B60W 60/0055 (2020.02); B60W 30/09 (2013.01); B60W 30/12 (2013.01); B60W 50/10 (2013.01); B60W 60/007 (2020.02); *B60W 2510/202* (2013.01); *B60W 2520/10* (2013.01); *B60W 2520/12* (2013.01); *B60W 2530/10* (2013.01); *B60W 2540/18* (2013.01); *B60W 2552/30* (2020.02); *B60W 2552/40* (2020.02); *B60W 2552/50* (2020.02); *B60W 2554/803* (2020.02); *B60W 2554/804* (2020.02); *B60W 2555/20* (2020.02)

(58) Field of Classification Search
None
See application file for complete search history.

(56) References Cited

U.S. PATENT DOCUMENTS

| | | | |
|---|---|---|---|
| 2019/0300013 A1* | 10/2019 | Shiraishi | B60W 60/0053 |
| 2020/0269839 A1* | 8/2020 | Sato | B60W 50/0097 |
| 2023/0159045 A1* | 5/2023 | Yasui | B60K 35/00 |
| | | | 340/435 |

* cited by examiner

*Primary Examiner* — James J Lee
*Assistant Examiner* — Jonathan E Reinert
(74) *Attorney, Agent, or Firm* — Lorenz & Kopf LLP

(57) ABSTRACT

In accordance with an exemplary embodiment, methods and systems are provided for controlling steering of an autonomous vehicle. The method includes: operating, by a processor, the autonomous vehicle in a path-based automated driving assist mode; receiving, by the processor, driver input including a driver torque; classifying, by the processor, an operation mode based on a type of the path-based automated driving assist mode; determining, by the processor, an override threshold for overriding the path-based automated driving assist mode on a first lateral side of the autonomous vehicle based on the operation mode; determining, by the processor, a driver override status based on the override torque threshold; and generating, by the processor, control signals to control the steering of the autonomous vehicle based on the driver override status and the driver torque.

20 Claims, 7 Drawing Sheets

METHODS AND SYSTEMS FOR A UNIFIED DRIVER OVERRIDE FOR PATH BASED AUTOMATED DRIVING ASSIST UNDER EXTERNAL THREAT

TECHNICAL FIELD

The technical field generally relates to vehicles and, more specifically, to methods and systems for driver overriding of path based automated driving assist when an external threat is present.

Path-based automated driving assist features function to achieve automated lane keeping and/or lane following through steering control. While automated steering control is in progress, the driver should be allowed to override the control at any time. When the driver overrides the control, for example, when an external threat is present, it is desirable provide a natural driver override feel. It is further desirable to provide consistency of the driver override feel across various automated driving assist features such as lane keep assist, lateral impact avoidance, and hands-on lane centering features.

Accordingly, it is desirable to provide methods and systems for providing a driver override of path based automated driving assist when an external threat is present. Furthermore, other desirable features and characteristics of the present invention will become apparent from the subsequent detailed description and the appended claims, taken in conjunction with the accompanying drawings and the foregoing technical field and background.

SUMMARY

In accordance with an exemplary embodiment, methods and systems are provided for controlling steering of an autonomous vehicle. The method includes: operating, by a processor, the autonomous vehicle in a path-based automated driving assist mode; receiving, by the processor, driver input including a driver torque; classifying, by the processor an operation mode based on a type of the path-based automated driving assist mode; determining, by the processor, an override threshold for overriding the path-based automated driving assist mode on a first lateral side of the autonomous vehicle based on the operation mode; determining, by the processor, a driver override status based on the override torque threshold; and generating, by the processor, control signals to control the steering of the autonomous vehicle based on the driver override status and the driver torque.

In various embodiments, the path-based automated driving assist mode includes at least one of a lane keep assist mode, a lateral impact avoidance mode, and a hands-on lane centering mode.

In various embodiments, the method includes, in response to detecting a presence of a safety barrier on lateral sides of the autonomous vehicle, determining a safety barrier override threshold, and wherein the determining the override threshold is further based on the safety barrier override threshold.

In various embodiments, the determining the safety barrier override threshold is based on a classification of the safety barrier and barrier dynamics between the autonomous vehicle and the safety barrier.

In various embodiments, the barrier dynamics include a time to impact and a relative velocity between the autonomous vehicle and the safety barrier.

In various embodiments, the determining the classification of the safety barrier is based on a type of the safety barrier and a severity of a barrier intrusion.

In various embodiments, the determining the override threshold is based on a steady state steering torque associated with a lane curvature, vehicle parameters, and external disturbances.

In various embodiments, the external disturbances include at least one of a road angle, a road friction, and a crosswind.

In various embodiments, the vehicle parameters include at least one of a vehicle velocity, a vehicle inertia, and a vehicle mass.

In various embodiments, the determining the driver override status is further based on a magnitude and direction of controller torque, a magnitude and direction of the driver torque, and a turn switch direction.

In another embodiments, a system for controlling steering of an autonomous vehicle is provided. The system includes a non-transitory computer readable medium comprising computer instructions configured to perform a process; and a processor, configured to perform the process. The process includes: operating, by the processor, the autonomous vehicle in a path-based automated driving assist mode; receiving, by the processor, driver input including a driver torque; classifying, by the processor, an operation mode based on a type of the path-based automated driving assist mode; determining, by the processor, an override threshold for overriding the path-based automated driving assist mode on a first lateral side of the autonomous vehicle based on the operation mode, determining, by the processor, a driver override status based on the override threshold; and generating, by the processor, control signals to control the steering of the autonomous vehicle based on the driver override status and the driver torque.

In various embodiments, the path-based automated driving assist mode includes at least one of a lane keep assist mode, a lateral impact avoidance mode, and a hands-on lane centering mode.

In various embodiments, the process further comprises, in response to detecting a presence of a safety barrier on the lateral sides of the autonomous vehicle, determining a safety barrier override threshold, and wherein the determining the override threshold is further based on the safety barrier override threshold.

In various embodiments, the determining the safety barrier override threshold is based on a classification of the safety barrier and barrier dynamics between the autonomous vehicle and the safety barrier.

In various embodiments, the barrier dynamics include a time to impact and a relative velocity between the autonomous vehicle and the safety barrier.

In various embodiments, the determining the classification of the safety barrier is based on a type of the safety barrier and a severity of a barrier intrusion.

In various embodiments, the determining the override threshold is based on a steady state steering torque associated with a lane curvature, vehicle parameters, and external disturbances.

In various embodiments, the external disturbances include at least one of a road angle, a road friction, and a crosswind.

In various embodiments, the vehicle parameters include at least one of a vehicle velocity, a vehicle inertia, and a vehicle mass.

In various embodiments, the determining the driver override status is further based on a magnitude and direction of controller torque, a magnitude and direction of the driver torque, and a turn switch direction.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
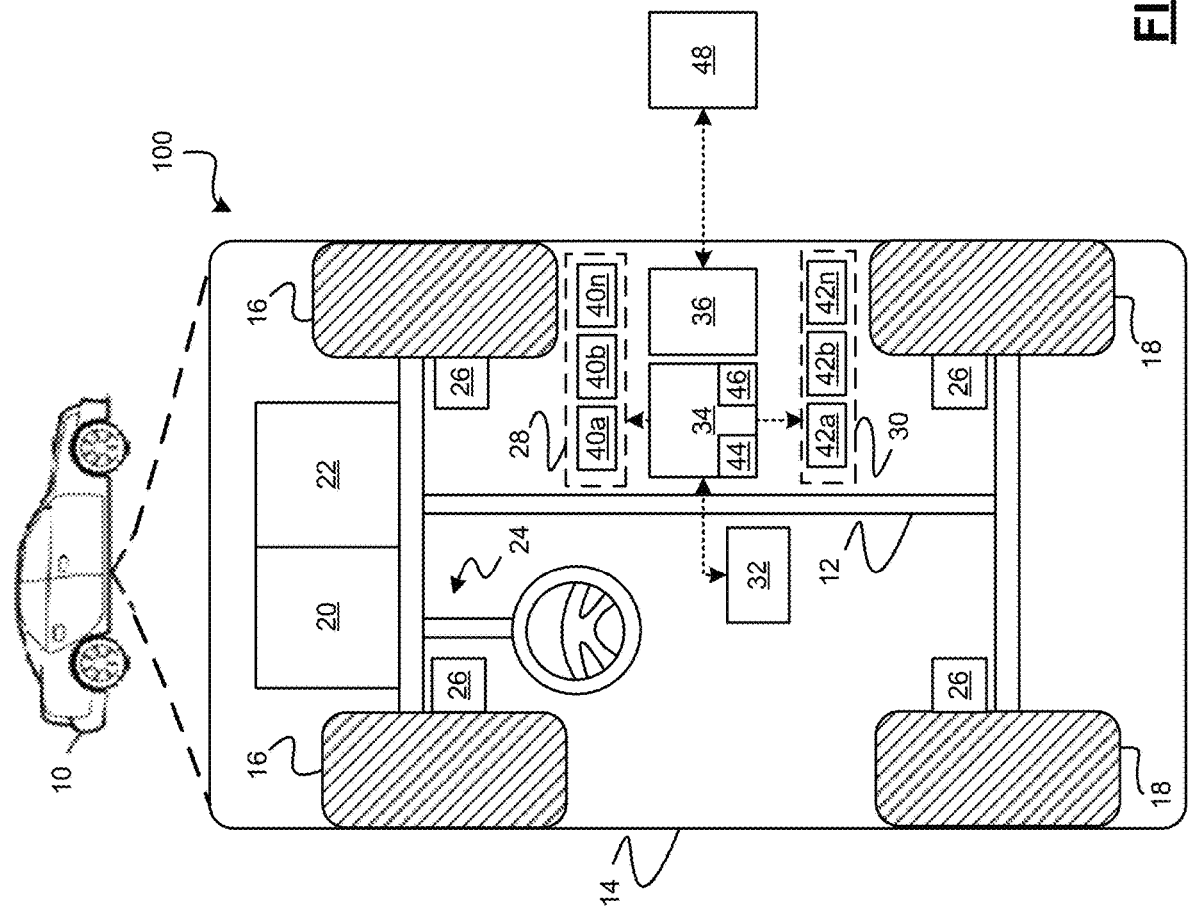
FIG. 1 is a functional block diagram of an autonomous vehicle that includes a driver override system, in accordance with exemplary embodiments.

With reference to FIG. 1, a driver override system shown generally at 100 is associated with a vehicle 10 in accordance with various embodiments. In general, the driver override system 100 allows for a driver to override automated steering control of the vehicle 10 in a safe and natural way. In various embodiments, the driver override system 100 provides systematic methods and systems to efficiently determine driver override thresholds so as to provide natural driver override feel. For example, the driver override system 100 independently evaluates an override threshold for each of the left side and the right side of the vehicle 10 and, in various embodiments, adaptively modifies the override threshold based on a safety barrier classification. In various embodiments, the driver override system 100 unifies the override strategies for different driving assist operation modes.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the driver override system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Two or Three level of automation. As can be appreciated, in various embodiments, the autonomous vehicle 10 can be any level of automation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
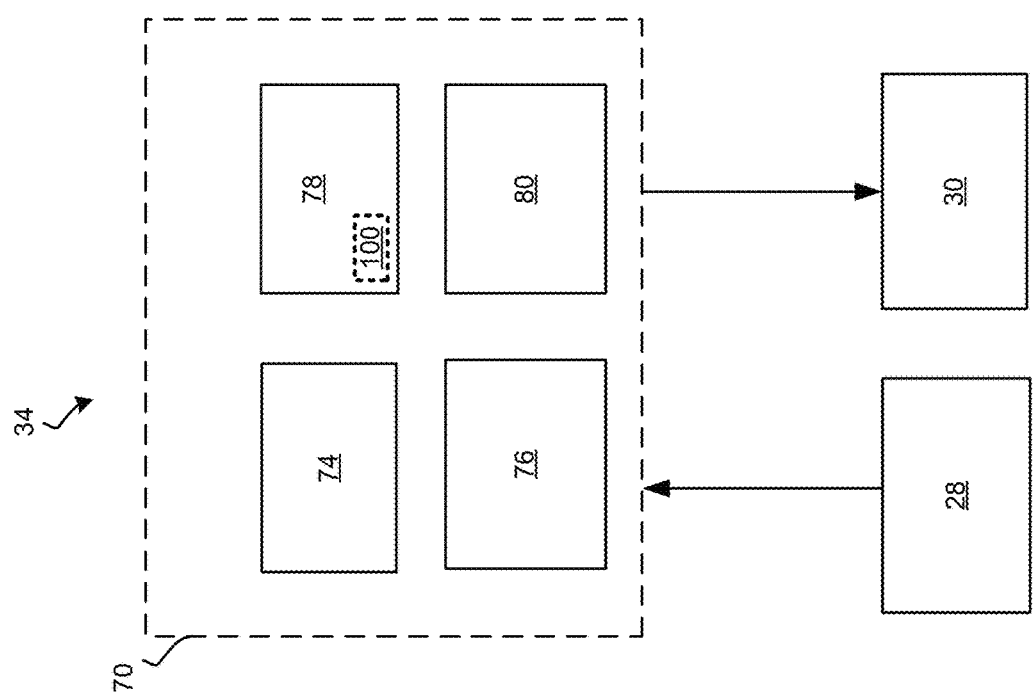
FIG. 2 is a functional block diagram of an autonomous driving system of the autonomous vehicle that includes the driver override system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. In various embodiments, the defined maps include height maps of the environment that are used by the system 100. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the driver override system 100 and, when executed by the processor 44, process data from the sensors and/or data from within the controller to determine a driver override threshold and uses the driver override threshold to determine a driver override status indicating whether the driver input, or autonomous control should be used to control the steering of the vehicle 10.

In accordance with various embodiments, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, all or parts of the driver override system 100 of FIG. 1 is included within the ADS 70, for example, as part of the guidance system 78 and/or the vehicle control system 80. For example, the driver override system 100 generates data indicating an override status for the guidance system 78 so that the guidance system 78 can communicate whether the autonomous features are controlling the steering, or the driver input is controlling the steering to the vehicle control system 80.

Figure 3:
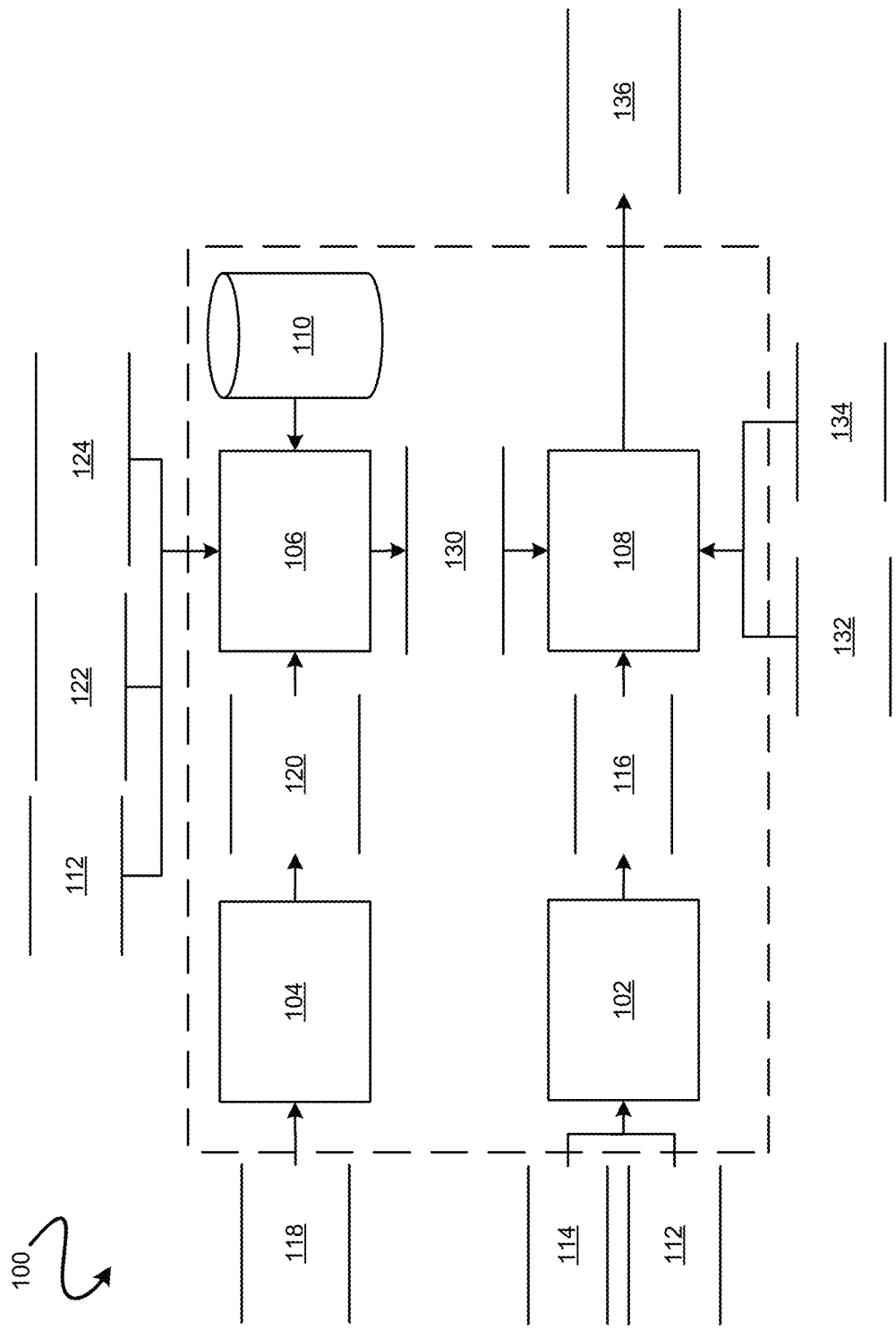
FIG. 3 is a dataflow diagram illustrating a driver override system, in accordance with exemplary embodiments.

For example, as shown in more detail with regard to FIG. 3 and with continued reference to FIGS. 1 and 2, the driver override system 100 includes an operation mode determination module 102, a safety barrier override module 104, an override threshold determination module 106, a unified override logic module 108, and a calibration datastore 110.

The operation mode determination module 102 receives as input feature mode data 112 and threat data 114. The operation mode determination module 102 classifies an operation mode (M) and generates operation mode data 116 based on a type of driving assist feature mode that is active as indicated by the feature mode data 112 and further based on a detected threat indicated by the threat data 114. For example, the driving assist feature mode can be, but is not limited to, a lateral impact avoidance mode, a lane keep assist mode, or a hands-on lane centering assist mode. The threat detection can indicate if a threat is detected on the left side of the vehicle 10 or the right side of the vehicle 10.

Figure 4:
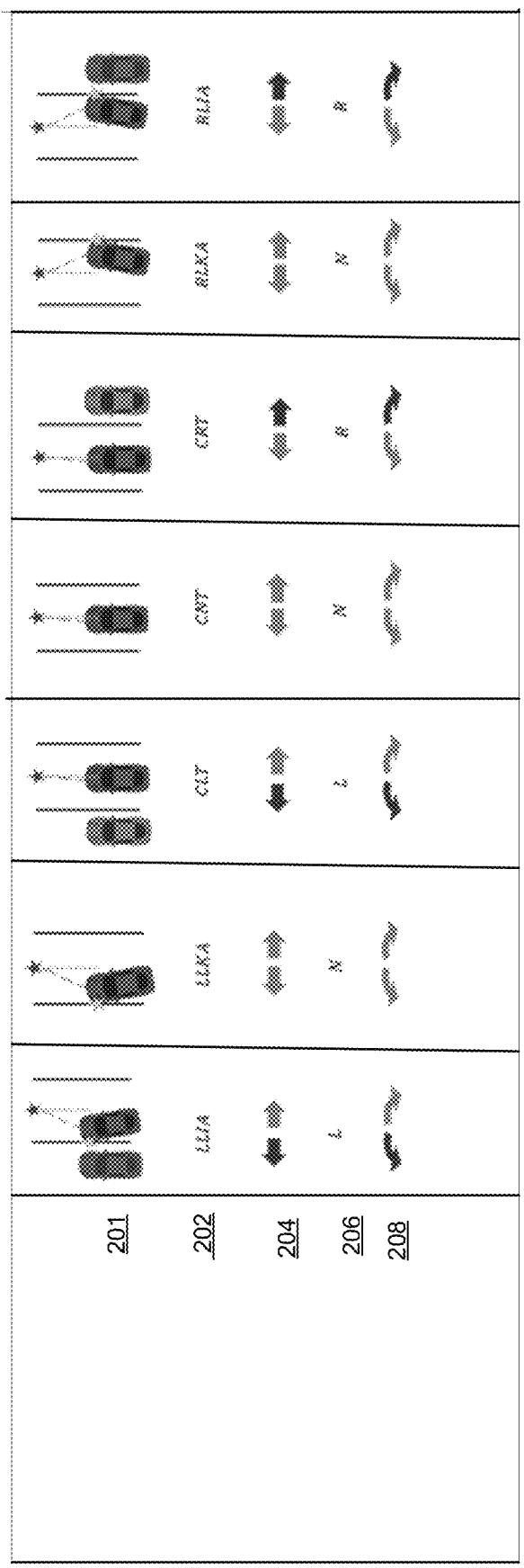
FIG. 4 is a chart illustrating driver override logic and relationships of the logic of the driver override system, in accordance with exemplary embodiments.

In various embodiments, as shown in FIG. 4, the operation mode determination module 102 classifies the operation mode (M) 202 based on the scenario 201 to be one of a left impact avoidance mode (LLIA), a left lane keep assist mode (LLKA), a lane centering assist left threat mode (CLT), a lane centering assist mode (CNT), a lane centering assist right threat mode (CRT), a right lane keep assist mode (RLKA), and a right impact avoidance mode (RLIA). Each of the modes is defined by a turn switch direction $(I_d)$ 204, a threat side (S) 206, and a driver torque direction (Dτd) 208, as illustrated.

With reference back to FIG. 3, the safety barrier override module 104 receives safety barrier data 118. The safety barrier override module 104 independently detects the presence of a safety barrier on each lateral side of the vehicle 10 and adaptively modifies a respective safety barrier override threshold $(G_{SB})$ depending on a classification of the safety barrier $(G_{Bar})$. For example, the safety barrier override threshold $(G_{SB})$ is increased near safety barriers classified as less critical and the safety barrier override threshold is further increased near safety barriers classified as critical safety barriers. The safety barrier override module 104 generates safety barrier override threshold data 120 indicating the safety barrier threshold $(G_{SB})$.

Figure 5:
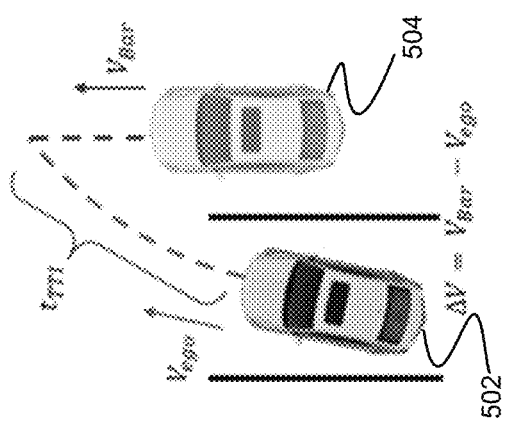
FIG. 5 is an illustration of safety barrier dynamics used by the driver override system, in accordance with exemplary embodiments.

In various embodiments, the classification of the safety barrier $(G_{Bar})$ can be determined as a function of barrier dynamics $(G_{BarDyn})$ and barrier classes $(G_{BarClass})$. For example, as shown in FIG. 5, the barrier dynamics $(G_{BarDyn})$ is determined from the dynamics between the ego vehicle 502 and the safety barrier 504, such as time-to-impact $(t_{TTI})$ and a relative velocity $(\Delta V)$ between the ego vehicle 502 and the safety barrier 504. In another example, the barrier class $(G_{BarClass})$ is identified from the type of the safety barrier 504, and the severity of barrier intrusion which can depend on the vehicle type (e.g., car, bus, semi-truck, construction vehicle, etc.) the lane line type (e.g., dashed line, solid line, double line, etc.) and identified objects or landmarks (e.g., signs, buildings, geography, etc.).

With reference back to FIG. 3, the override threshold determination module 106 receives the safety barrier override threshold data 120, the feature mode data 112, vehicle parameters data 122, and external disturbances data 124. The override threshold determination module 106 determines an optimal override threshold and generates override threshold data 130 using vehicle and math-based data that provides natural driver override feel and consistent performance across different vehicle applications.

Figure 6:
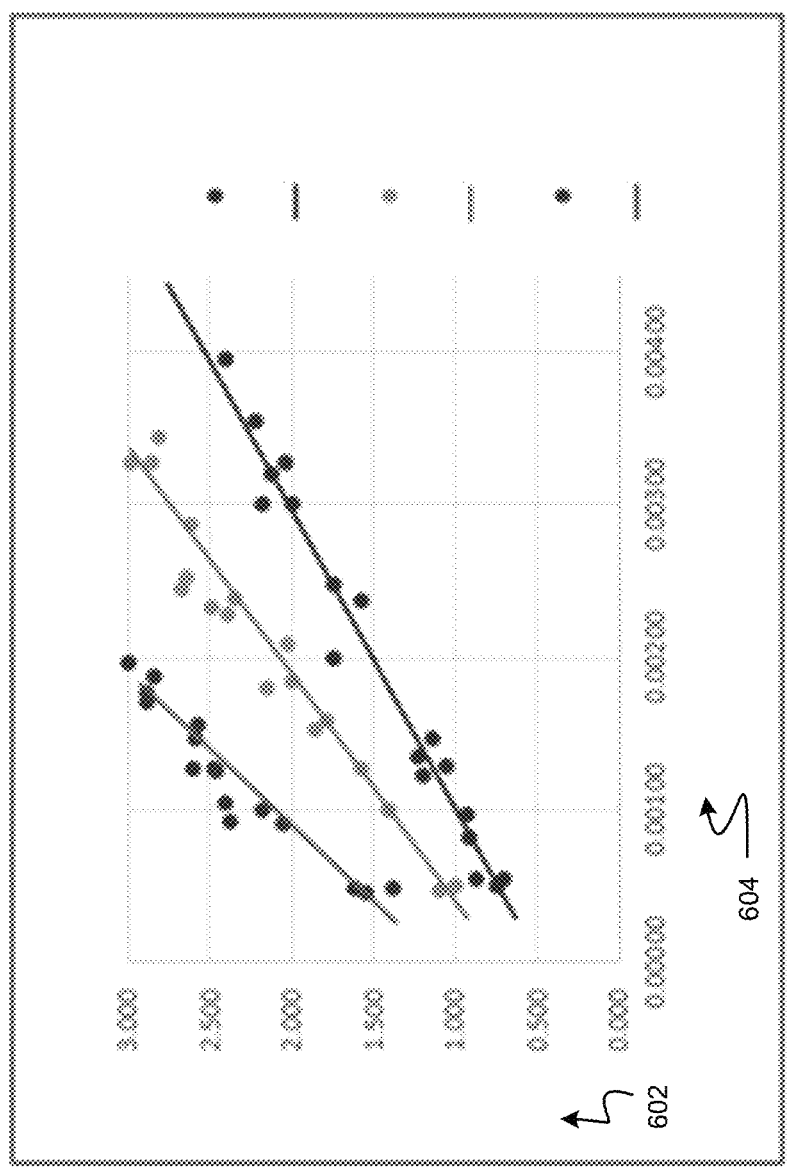
FIG. 6 is a graph illustrating steady state torque values used by the driver override system, in accordance with exemplary embodiments.

For example, the calibration datastore 110 stores calibration data, as shown in FIG. 6, that characterizes steady-state driver steering torque 604 that tracks different curvatures 602 with varying vehicle parameters such as speeds (37 mph, 52 mph, and 67 mph) and disturbances (e.g., crosswind, road bank angle, road friction, etc.). The required steering torque can be derived from empirical or analytical data such as vehicle tests or engineering calculations. The override threshold determination module 106 derives an optimal override threshold by setting the override threshold to closely match the steady-state steering torque $\tau_{ss}$ required to track the target path curvature under the measured vehicle parameters and external disturbances. This provides a natural driver override feel during override maneuver on curved roads in the absence of safety barriers. The safety barrier threshold acts as a modifier of the override threshold to increase the difficulty of override maneuver that would bring the vehicle into collision with safety barrier. The additional driver override effort deters the driver from inadvertently overriding the driving assist feature.

With reference back to FIG. 3, the unified override logic module 108 receives the operation mode data 116, the override threshold data 130, driver inputs data 132, and controller inputs data 134. The unified override logic module 108 computes the override condition flag (O) and generates override flag data 136 based on the operation mode (M), the override threshold (G), a threat side (S), driver inputs (i.e., a turn switch direction $I_D$, a driver steering torque magnitude $\tau_D$ and direction $D_{\tau D}$) as well as controller inputs (i.e., controller steering torque magnitude τ and direction $D_\tau$). For example, in the unified override logic, lateral-directional driver inputs such as turn switch and steering torque can activate the override condition flag (O). Discrete and invariant driver inputs such as turn switch activation can set the override condition flag (O) on the side of the indication in the absence of side threat. Turn switch direction $(I_D)$ is compared against threat side (S) to determine whether an override is allowed in the direction of the turn switch indication. Continuous and varying driver inputs such as steering torque can set the override condition flag (O) in the presence of side threat if the driver inputs meet or exceed the override thresholds (G) in the override threshold data 130. To determine the driver override direction, driver steering torque $(\tau_D)$ and direction $(D_{\tau D})$ is compared against the controller steering torque (τ) and direction $(D_\tau)$. The override condition flag (O) is set if the driver inputs meet or exceed the override threshold (G) in the override direction.

Figure 7:
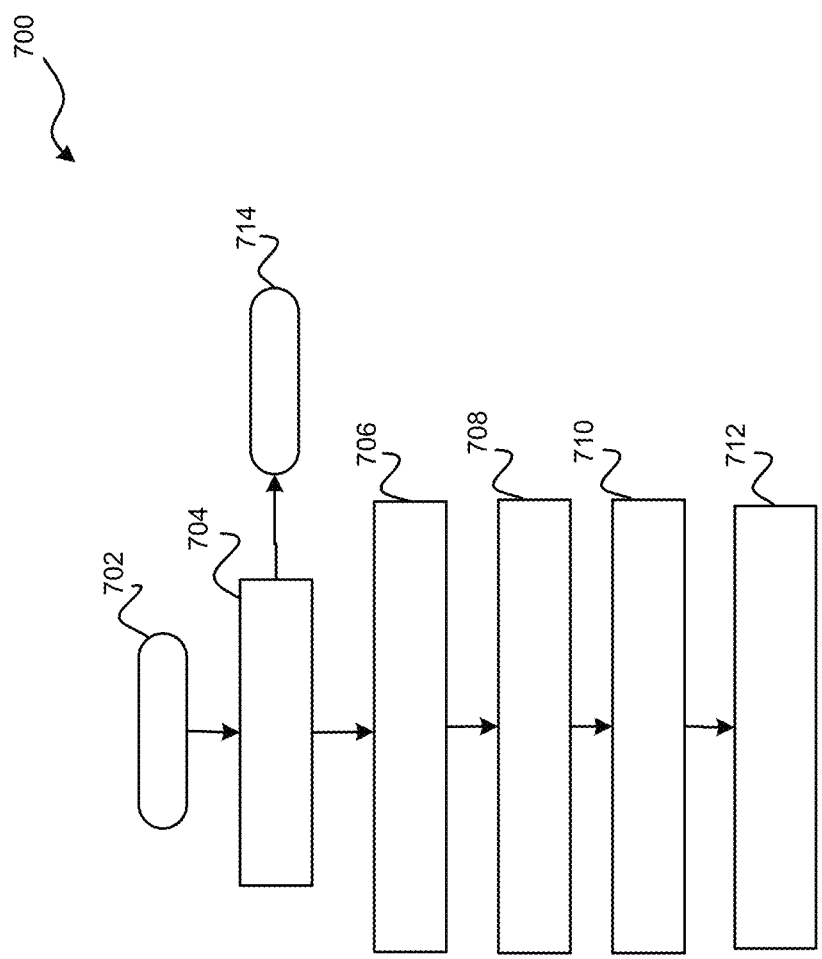
FIG. 7 is a flowchart of a process for providing driver override features to control steering of the autonomous vehicle, in accordance with exemplary embodiments.

FIG. 7 is a flowchart of a process 700 for determining the driver override status, in accordance with exemplary embodiments. The process 700 can be implemented in connection with the vehicle 10 of FIG. 1, the ADS 70 of FIG. 2, and the driver override system 100 of FIG. 3 in accordance with exemplary embodiments. As can be appreciated in light of the disclosure, the order of operation within the process 700 is not limited to the sequential execution as illustrated in FIG. 7, but may be performed in one or more varying orders as applicable and in accordance with the present disclosure. In various embodiments, the process 700 can be scheduled to run based on one or more predetermined events, and/or can run continuously during operation of the vehicle 10.

As depicted in FIG. 7, the process 700 may begin at 702. For each lateral side of the vehicle 10 at 704, the override status is determined at 706-712. For example, the operation mode (M) is determined at 706 based on the feature mode and the detected threat. The safety barrier threshold (GSB) is determined at 708 based on the barrier dynamics and barrier class. The override threshold is determined based, in part, on the safety barrier threshold (GSB) at 710. The override status is then determined based on the override mode, the threat side, the override threshold, driver inputs, and controller inputs. Once the status has been determined for each lateral side, the method may end at 714.

Accordingly, methods, systems, and vehicles are provided for driver override for steering during automated lane-based assist functions. It will be appreciated that the systems, vehicles, and methods may vary from those depicted in the Figures and described herein. For example, the vehicle 10 of FIG. 1, and the system 100 of FIG. 3 and components thereof, may vary in different embodiments. It will similarly be appreciated that the steps of the process 700 may differ from those depicted in FIG. 7, and/or that various steps of the process 700 may occur concurrently and/or in a different order than that depicted in FIG. 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling steering of an autonomous vehicle, comprising:
    operating, by a processor, the autonomous vehicle in a path-based automated driving assist mode;
    receiving, by the processor:
        driver input data including a driver steering torque direction, and a turn switch direction; and
        threat data;
    classifying, by the processor, an operation mode based on a type of the path-based automated driving assist mode, the turn switch direction, the driver steering torque direction, and a lateral side location of a threat, indicated by the threat data;
    determining, by the processor, an override threshold for overriding the path-based automated driving assist mode for a first lateral side of the autonomous vehicle based on the classified operation mode;
    determining, by the processor, a driver override status based on the override threshold; and
    generating, by the processor, control signals to control the steering of the autonomous vehicle based on the driver override status and the driver steering torque direction.

2. The method of claim 1, wherein the path-based automated driving assist mode includes at least one of a lane keep assist mode, a lateral impact avoidance mode, and a hands-on lane centering mode.

3. The method of claim 1, further comprising, in response to detecting a presence of a safety barrier on lateral sides of the autonomous vehicle, determining a safety barrier override threshold, and wherein the determining the override threshold is further based on the safety barrier override threshold.

4. The method of claim 3, wherein the determining the safety barrier override threshold is based on a classification of the safety barrier and barrier dynamics between the autonomous vehicle and the safety barrier.

5. The method of claim 4, wherein the barrier dynamics include a time to impact and a relative velocity between the autonomous vehicle and the safety barrier.

6. The method of claim 4, wherein the determining the classification of the safety barrier is based on a type of safety barrier and a severity of a barrier intrusion.

7. The method of claim 1, wherein the determining the override threshold is based on a steady state steering torque associated with a lane curvature, vehicle parameters, and external disturbances.

8. The method of claim 7, wherein the external disturbances include at least one of a road angle, a road friction, and a crosswind.

9. The method of claim 7, wherein the vehicle parameters include at least one of a vehicle velocity, a vehicle inertia, and a vehicle mass.

10. The method of claim 1, wherein the determining the driver override status is further based on a magnitude and direction of controller torque, a magnitude and direction of the driver torque, and a turn switch direction.

11. A system for controlling steering of an autonomous vehicle, comprising:
    a non-transitory computer readable medium comprising computer instructions configured to perform a process; and
    a processor, configured to perform the process, the process comprising:
        operating, by the processor, the autonomous vehicle in a path-based automated driving assist mode;
        receiving, by the processor:
            driver input data including a driver steering torque direction, and a turn switch direction; and
            threat data;
        classifying, by the processor, an operation mode based on a type of the path-based automated driving assist mode, the turn switch direction, the driver steering torque direction, and a lateral side location of a threat, indicated by the threat data;
        determining, by the processor, an override threshold for overriding the path-based automated driving assist mode for a first lateral side of the autonomous vehicle based on the classified operation mode;
        determining, by the processor, a driver override status based on the override threshold; and
        generating, by the processor, control signals to control the steering of the autonomous vehicle based on the driver override status and the driver steering torque direction.

12. The system of claim 11, wherein the path-based automated driving assist mode includes at least one of a lane keep assist mode, a lateral impact avoidance mode, and a hands-on lane centering mode.

13. The system of claim 11, wherein the process further comprises, in response to detecting a presence of a safety barrier on lateral sides of the autonomous vehicle, determining a safety barrier override threshold, and wherein the determining the override threshold is further based on the safety barrier override threshold.

14. The system of claim 13, wherein the determining the safety barrier override threshold is based on a classification of the safety barrier and barrier dynamics between the autonomous vehicle and the safety barrier.

15. The system of claim 14, wherein the barrier dynamics include a time to impact and a relative velocity between the autonomous vehicle and the safety barrier.

16. The system of claim 14, wherein the determining the classification of the safety barrier is based on a type of the safety barrier and a severity of a barrier intrusion.

17. The system of claim 11, wherein the determining the override threshold is based on a steady state steering torque associated with a lane curvature, vehicle parameters, and external disturbances.

18. The system of claim 17, wherein the external disturbances include at least one of a road angle, a road friction, and a crosswind.

19. The system of claim 17, wherein the vehicle parameters include at least one of a vehicle velocity, a vehicle inertia, and a vehicle mass.

20. The system of claim 11, wherein the determining the driver override status is further based on a magnitude and direction of controller torque, a magnitude and direction of the driver torque, and a turn switch direction.

\* \* \* \* \*